(12) United States Patent
Andrade et al.

(10) Patent No.: US 8,499,292 B2
(45) Date of Patent: Jul. 30, 2013

(54) VIRTUAL EXECUTION ENVIRONMENT FOR STREAMING LANGUAGES

(75) Inventors: Henrique Andrade, Yorktown Heights, NY (US); Jim Challenger, White Plains, NY (US); Bugra Gedik, Yorktown Heights, NY (US); Robert Grimm, New York, NY (US); Martin J. Hirzel, Yorktown Heights, NY (US); Vibhore Kumar, Yorktown Heights, NY (US); Robert Soule, Yorktown Heights, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 12/719,364

(22) Filed: Mar. 8, 2010

(65) Prior Publication Data

US 2011/0219362 A1  Sep. 8, 2011

(51) Int. Cl.
*G06F 9/45* (2006.01)
(52) U.S. Cl.
USPC .......................... 717/146; 717/143; 717/148
(58) Field of Classification Search
USPC .................................................. 717/124–148
See application file for complete search history.

(56) References Cited

U.S. PATENT DOCUMENTS 8,291,006 B2 * 10/2012 Andrade et al. .............. 709/201

* cited by examiner

*Primary Examiner* — Chuck Kendall
(74) *Attorney, Agent, or Firm* — F. Chau & Associates, LLC; Louis J. Percello, Esq.

(57) ABSTRACT

A virtual execution environment (VEE) for a streaming Intermediate Language (IL), wherein the streaming IL represents a streaming program, communicates streaming data in queues, stores data-at-rest in variables, and determines data by functions, where inputs are read from the queues and the variables, and outputs are written to the queues and the variables.

12 Claims, 6 Drawing Sheets

VIRTUAL EXECUTION ENVIRONMENT FOR STREAMING LANGUAGES

STATEMENT OF GOVERNMENT RIGHTS

This invention was made with government support under contract no. H98230-07-C-0383, awarded by the United States Department of Defense. The Government has certain rights in this invention.

BACKGROUND

1. Technical Field

The present disclosure generally relates to virtual execution environments, and more particularly to virtual execution environments for streaming languages.

2. Discussion of Related Art

In data stream processing, data flows through a data flow graph, where each directed edge is a FIFO (first-in-first-out) queue, and each vertex is an operator that processes streaming data on-the-fly. This computing model is characterized by data in motion, since data continuously flows on queues between operators, and typically the total volume of data over time far exceeds the storage capacity of any single machine. Each operator repeatedly fires to consume a small amount of data from its input queues(s) and produce data on its output queue(s). The operators in the graph typically run in parallel with each other, making data stream processing amenable for high performance computing tasks on parallel or distributed hardware. Programs typically run for weeks or months, though we will also consider the special case of batch jobs that only run on the order of a few minutes, if those batch jobs fit the streaming model.

A streaming language is a programming language designed to express streaming applications. Streaming languages have features that directly represent the data flow graph, where the primary means of data exchange between operators is through FIFO queues. Example streaming languages include but are not limited to StreamIt, CQL, and Sawzall.

The StreamIt language has been used for applications such as video streaming. A tape in StreamIt terminology is a queue, and a filter is an operator. The user implements filters and arranges them in a data flow graph. Each time a filter fires, it pops some data from its input tape, does some computation, then pushes some data on its output tape.

CQL, the Continuous Query Language, has been used for applications such as road traffic monitoring. CQL is a dialect of the widely-used database language SQL, and as such, CQL includes a set of relational operators.

The Sawzall language has been used for batch applications such as web content analysis. Even though it is intended for batch jobs, it exhibits streaming characteristics, since data flows over a data flow graph of queues through operators. In Sawzall, the user implements a map operator and selects an aggregator operator from a built-in library.

According to an embodiment of the present disclosure, a need exists for a method for implementing multiple streaming languages, with multiple optimizations, running on multiple platforms.

BRIEF SUMMARY

According to an embodiment of the present disclosure, a Virtual Execution Environment (VEE) for a streaming Intermediate Language (IL), wherein the streaming IL represents a streaming program, communicates streaming data in queues, stores data-at-rest in variables, and determines data by functions, where inputs are read from the queues and the variables, and outputs are written to the queues and the variables.

According to an embodiment of the present disclosure, a Virtual Execution Environment (VEE) embodied in a non-transitory computer readable medium executed by a processor, the VEE comprising one translator module for each streaming language to a streaming Intermediate Language (IL), and one runtime module for each platform to execute the streaming IL, wherein the streaming IL supports multiple languages by translation, and the VEE maps to multiple platforms.

According to an embodiment of the present disclosure, a Virtual Execution Environment (VEE) embodied in a non-transitory computer readable medium executed by a plurality of processors communicating via a network for managing a streaming language execution environment, the method including providing a streaming Intermediate Language (IL) representing a streaming program, communicating streaming data in queues between the plurality of processors, storing data-at-rest in variables shared by the plurality of processors, and determining data by functions, where inputs are read from the queues and the variables, and outputs are written to the queues and the variables.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Figure 1:
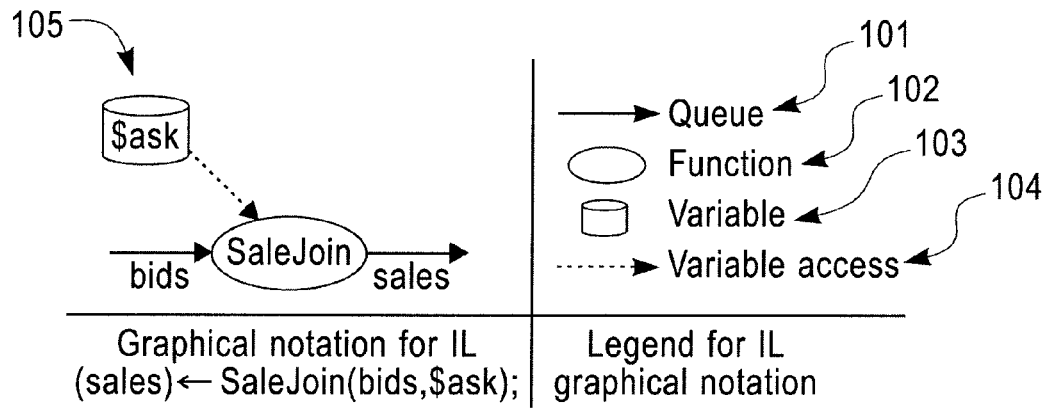
FIG. 1 shows a streaming intermediate language (IL) and its graphical notation according to an embodiment of the present disclosure.

According to exemplary embodiments of the present disclosure, a VEE (Virtual Execution Environment) is a formal machine or an environment that serves as an intermediate target when translating a language to a platform. The VEE is implemented for streaming languages, with a direct representation of streaming language concepts. That is, the VEE may be used to deploy streaming applications written in one or more streaming languages (or additional types of languages) having support for built-in data types.

The VEE includes a streaming Intermediate Language (IL) component. A streaming language is a programming language for stream computing, where data flows through a data flow graph whose edges are queues and whose vertices are operators that process streaming data on the fly. The operators have functions that are performed or fire many times over the program execution and run in parallel, and their primary means of data exchange is over streams. A streaming IL makes these concepts explicit by directly representing a graph of queues and operators. There are many different streaming languages and execution platforms. Previously, streaming language implementers had to write compilers for each combination of language and platform separately. The VEE described herein simplifies this task by only requiring one translator for each streaming language to the IL, and then one runtime for each platform to execute the IL. The IL supports multiple languages by translation, and a VEE that can map to multiple, including distributed, platforms.

According to an embodiment of the present disclosure, the streaming IL represents a streaming program by communicating streaming data in queues, storing data-at-rest in variables, and computing data by functions, where the inputs are read from queues and variables, and the outputs are written to queues and variables.

In this way, the IL focuses on the concept of streaming (functions that communicate primarily by streaming data over queues), and also provides variables to account for the fact that many streaming languages use at least local state to support functionality such as aggregation or synchronization. By making this state explicit, the streaming IL facilitates platform mappings, which reason about state, and also enables optional optimizations, which need to be aware of state. The IL has a textual representation, which can be formally specified as follows:

prog ::=out in op*
out ::='output' $q^{*(.)}$
in ::='input' $q^{*(.)}$
op ::='(' q*, v* ')' '←' 'f' '(' q*, v* ')' ';'
q ::=id
v ::='$'id
f ::=id The Kleene-star (*) meta-notation has its conventional Backus-Naur meaning of zero or more repetitions. For example, the first rule prog ::=out in op* indicates that an IL program consists of an output clause, an input clause, and zero or more operators. Beyond the formal syntax shown above, two more restrictions may be imposed on the IL: each queue is defined exactly once (either by appearing in the input clause or by appearing on the left-hand-side of an operator), and each queue is used exactly once (either by appearing in the output clause or by appearing on the right-hand-side of an operator). These single-definition single-use rules make it easier to reason about program snippets in isolation, which helps express optimization correctness conditions concisely. Even though the IL is represented textually, it is convenient to discuss examples graphically, and therefore, graphical notation is used in FIG. 1 for illustrative examples.

FIG. 1 shows graphical notations for queues 101, functions 102, variables 103 and variable access 104 and their use in an exemplary program 105.

The semantics of the IL are what constitute the hypothetical computer, or VEE: the semantics specify how an IL program executes to process streaming data. An IL program executes by repeating a method as long as there is at least one non-empty queue on the right-hand-side of any operator. More particularly, the VEE and IL are implemented in an environment comprising one or more processors or machines communicating via a network. The IL program method includes:

1. Selecting a non-empty queue that is on the right-hand-side of an operator as the firing queue. The semantics do not specify which queue to select when there are multiple eligible queues. This choice is left open, to model the fact that different runtimes, and even different executions within the same runtime, can make different choices due to non-determinism.

2. Removing the first data item from the firing queue. Queues model data items that are in-flight on streaming communication channels that may go over a network. Queues exhibit first-in-first-out (FIFO) behavior.

3. Calling the function of the operator that consumes the firing queue. The operator is uniquely identified due to the single-use rule. The parameters to the function are the data item from the firing queue; the index of the firing queue; and the data items stored in any input variables of this operator. The function is a piece of local deterministic communication, which is specified outside of the IL, for example, in a traditional language such as Pascal, C, or Java.

4. Placing the results from the function in output queues and variables of the operator. Since queues are FIFO, any outputs for queues are appended at the end, modeling the fact that the data items are sent on a streaming channel to another operator or output. Variable values, on the other hand, overwrite the previous contents.

As described above, the execution of a streaming IL program may either run continuously, or terminate when there is no more input data available.

The IL is a component of the VEE, and the VEE is a hypothetical computer with a specified semantics. In practice, the purpose of the VEE is to serve as an intermediate step for implementing multiple streaming languages on platforms.

Figure 2:
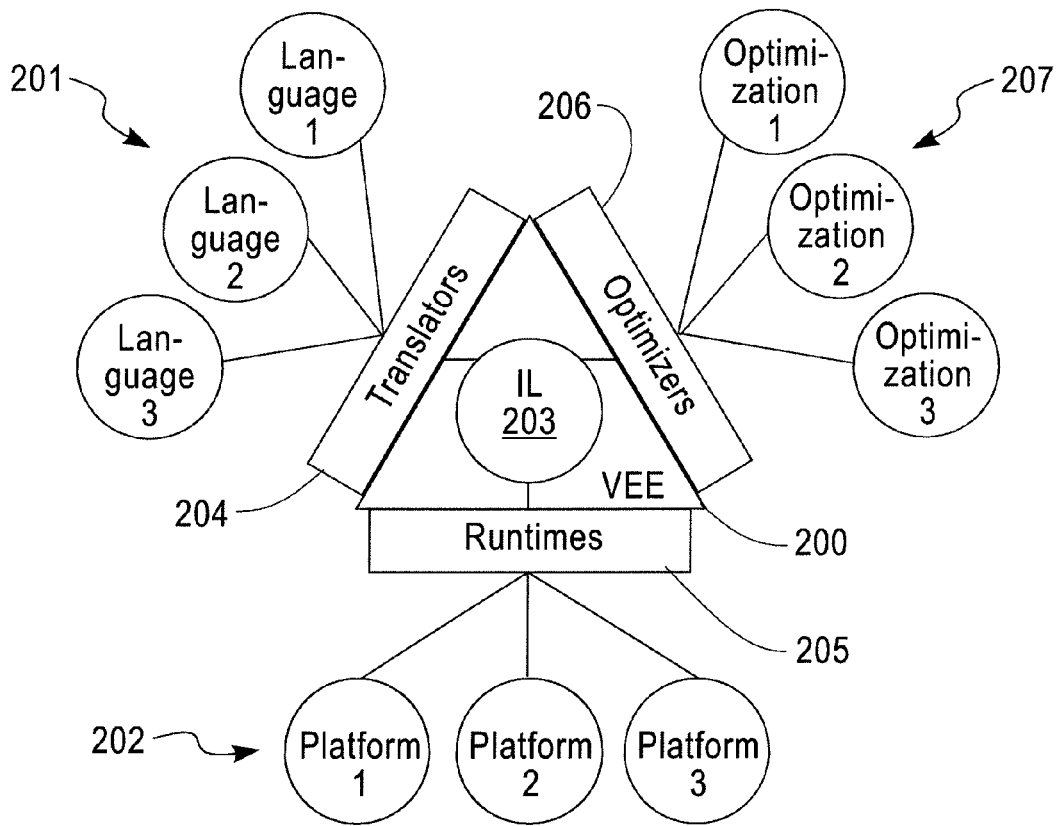
FIG. 2 shows a streaming virtual execution environment (VEE) according to an embodiment of the present disclosure.

Referring to FIG. 2, a streaming VEE 200 supports executing multiple streaming languages 201 on one or more platforms 202. The VEE accomplishes this using additional components of the VEE beyond the IL component 203. These additional components include translators 204 that map from streaming languages to streaming IL and a runtime 205 that executes the streaming IL on a platform.

In addition to the components discussed so far, FIG. 2 also shows optimizers 206, whose task it is to transform the IL 203 by applying various streaming optimizations 207. The optimizers 206 are optional in the sense that the VEE 200 works without them, but the VEE 200 accommodates them if provided. The VEE 200 and IL 203 rely on existing languages 201, platforms 202 and optionally, optimizations 207 combined by means of the VEE 200.

The translators, runtimes and optimizers may be implemented as modules of the VEE, in software, hardware or a combination thereof.

Figure 3:
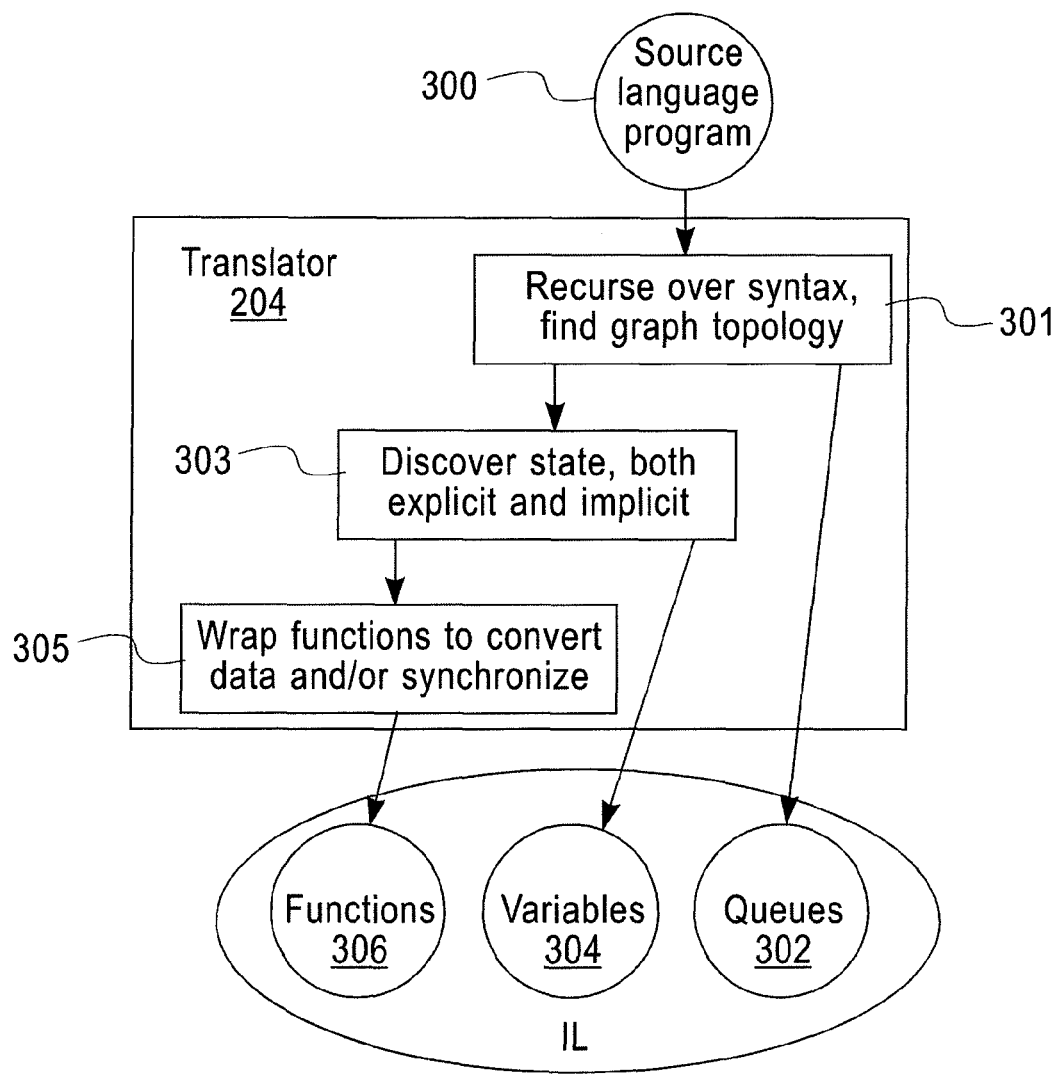
FIG. 3 is a detailed view of a translator component from FIG. 2.

The VEE 200 uses the translators 204 to map from streaming languages to the streaming IL. FIG. 3 illustrates a method for a translator from any streaming language. The method includes:

1. Mapping communication in the streaming language 300 to queues in the streaming IL 301. In many streaming languages, the graph topology of streaming communication is implicit in the syntactic structure of the program. Therefore, the translator discovers the queues 302 as part of recursing over the syntax of the source code.

2. Mapping state in the streaming language to variables in the streaming IL 303. Many streaming languages have some state, and typically the state is implicit. Examples for implicit state include windows; running aggregations such as count, max, average; synopses for operators such as relational join; buffers holding data items to synchronize computation into some deterministic ordering; etc. The translator makes such state explicit as IL variables 304.

3. Mapping local computation in the streaming language to functions in the streaming IL 305. Local computation happens in kernels, which invoke the same function repeatedly for each streaming data item. The IL assumes that these are pure functions; if the local computation is stateful, it is explicitly stored into a variable between function invocations. Making the state explicit is helpful for the runtime and optimizer components of the VEE. The translator creates functions 306 for the streaming IL by wrapping functions from the original source language to convert data and to deal with state.

The method may be illustrated by specific translators from existing streaming languages, such as CQL, StreamIt, and Sawzall.

Figure 6A:
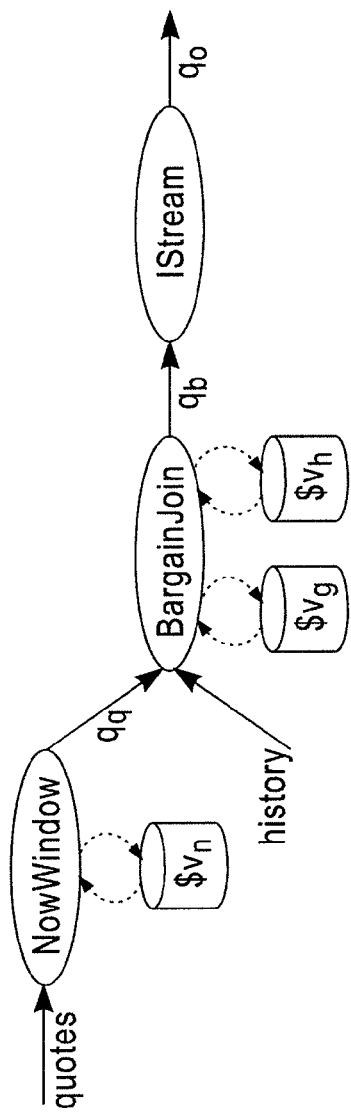
FIG. 6 shows the results of translating three example programs from three existing streaming languages according to an embodiment of the present disclosure.

The following CQL program implements a "Bargain Finder" example:

SELECT IStream(*) FROM quotes[Now], history
    WHERE    quotes.ask≦history.low    AND
        quotes.ticker==history.ticker FIG. 6(A) shows the translated IL. The first translator step discovers the queues by recursing over the syntax. In this case, there are two input queues quotes and history, two intermediate queues $q_q$ and $q_h$, and one output queue $q_o$. The second translator step discovers variables. In CQL, there is no explicit state, but many operators have implicit state. The NowWindow remembers the previous window state in variable $\$v_n$ to detect insertions and deletions in the current window state. The BargainJoin keeps synopses of both its inputs in $\$v_q$ and $\$v_h$ to join data items from either queue against the matching remembered state of the other. In this example, only the IStream operator is stateless, it has no variables. Unlike in the published previous CQL implementation, the translation chooses to keep variables local to one operator each, making it more amenable to parallel and possibly distributed execution. The IL helps see and exploit that. The third translator step wraps functions (in this case, well-known relational database operators) for use in the IL (in this case, reading and writing intermediate data to the chosen variables).

The following StreamIt program implements an "MPEG decoder" example:

```
pipeline {
    splitjoin {
        split roundrobin;
        filter { work { tf ← FrequencyDecode(peek(q)); push(tf);
            pop( ); } }
        filter { work { tm ← Motion VecDecode(peek(q)); push(tm);
            pop( ); } }
        join roundrobin;
    }
    filter { s; work { s, tc ← MotionComp(s, peek(1)); push(tc); pop( );
        } }
}
```

Figure 6B:
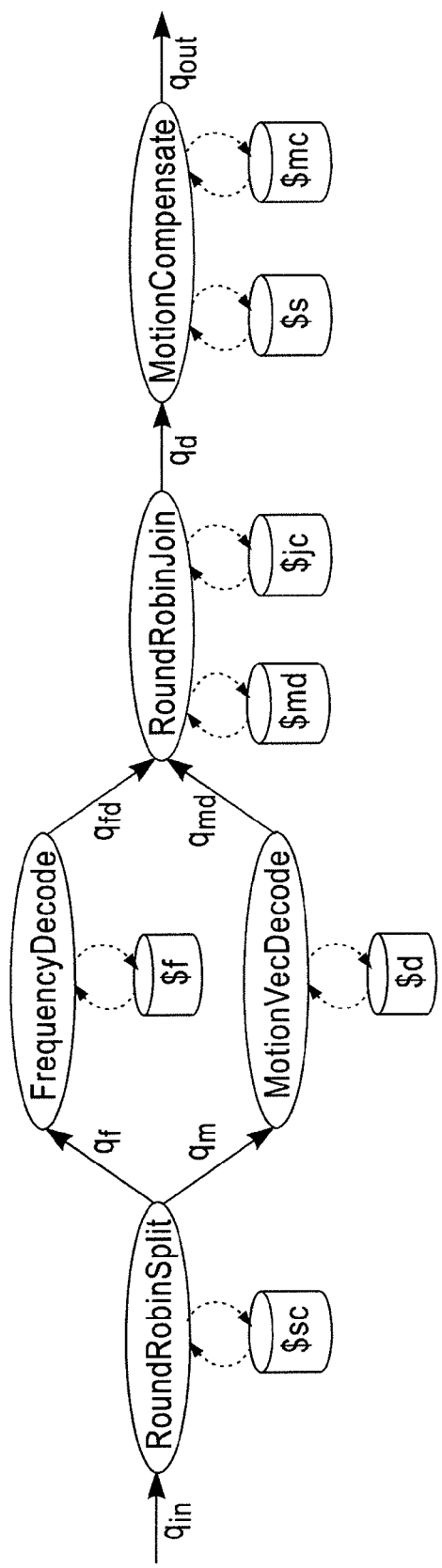

FIG. 6(B) shows the translated IL. The first translator step discovers the queues, resulting in a graph topology with a pipeline and a split-join subgraph. The second translator step discovers the variables, including the explicitly declared state s from the MotionComp filter as variable $s. The third translator step wraps the functions, meaning it constructs new functions that internally invoke the existing functions from the original StreamIt program. Those include both user-written functions for the three filters FrequencyDecode, MotionVecDecode, and MotionComp, and built-in functions for the split and join operators.

The following Sawzall program implements a "Query log analyzer" example:

```
queryOrigins : table sum;
queryTargets : table sum;
logRecord : input;
emit queryOrigins[getOrigin(logRecord)] ← 1;
emit queryTargets[getTarget(logRecord)] ← 1;
```

Figure 6C:
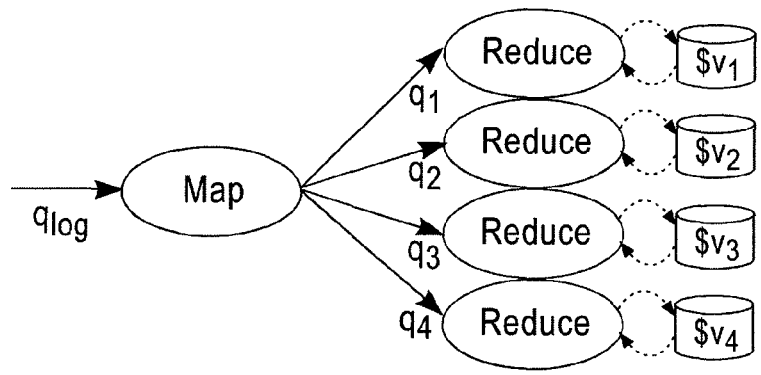

FIG. 6(C) shows the translated IL. The first translator step discovers the queues. For Sawzall, the basic topology is always the same, only the number of reducers (operators in the second stage of the graph) varies. The example translation uses four reducers. The second translator step discovers the variables. Sawzall is intentionally restricted such that the map operator is stateless, and each reduce operator keeps local state for its partition of the key space, which holds the final reduction at the end of the batch job. The third translator step wraps the functions; the Map function encapsulates the user-written code as well as code for sending intermediate data on the correct stream, and the Reduce function encapsulates the aggregations selected as table sum in the example.

These three examples (CQL, StreamIt, and Sawzall) are representative for other streaming languages. By following the translator method outlined here, other streaming languages can be mapped to our streaming IL.

Figure 4:
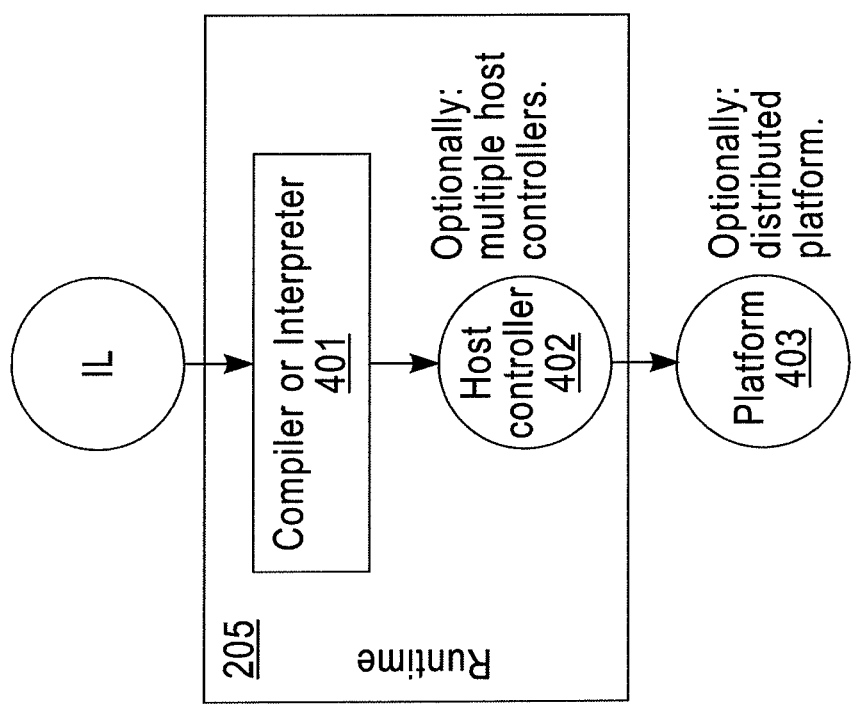
FIG. 4 is a detailed view of a runtime component from FIG. 2.

The VEE uses runtimes to execute the streaming IL on a platform. For example, the Stream Processing Core (SPC) is a streaming platform, and a runtime is implemented for executing the IL on the SPC. As illustrated in FIG. 4, a runtime for the VEE:

1. Makes the streaming IL executable on the platform by using a compiler or interpreter 401. A compiler translates the IL program to code that executes directly on the platform. An interpreter, on the other hand, is a program that executes directly on the platform and emulates the semantics of the IL program. Either way, the compiler or interpreter bridges the semantic gap between the IL level and the platform level.

2. Runs the streaming IL on the platform by using one or more host controllers 402. A host controller is a program that controls a host (a machine on the cluster) in order to execute part of the streaming computation. Our VEE is designed to support both centralized and distributed platforms. In a distributed platform, there are multiple hosts, which in general do not share memory, but provide communication channels that serve for implementing queues. The host controller sends and receives data from queues, provides storage for variables, and controls the invocation of one or more functions that are placed on this machine.

The method may be used to obtain a specific runtime 205 for the SPC platform. A compiler is selected, as opposed to an interpreter. The compiler maps from the IL program to SPC processing elements (PEs) and into XML descriptions of PE ports and their types. Each PE is a program that contains the actual application logic in the form of one or more functions and variables. The XML describes the end-points of queues. Since SPC is a distributed platform, multiple host controllers are selected. The host controllers execute the PEs on hosts, and use the XML to decide where to send data 403.

Figure 5:
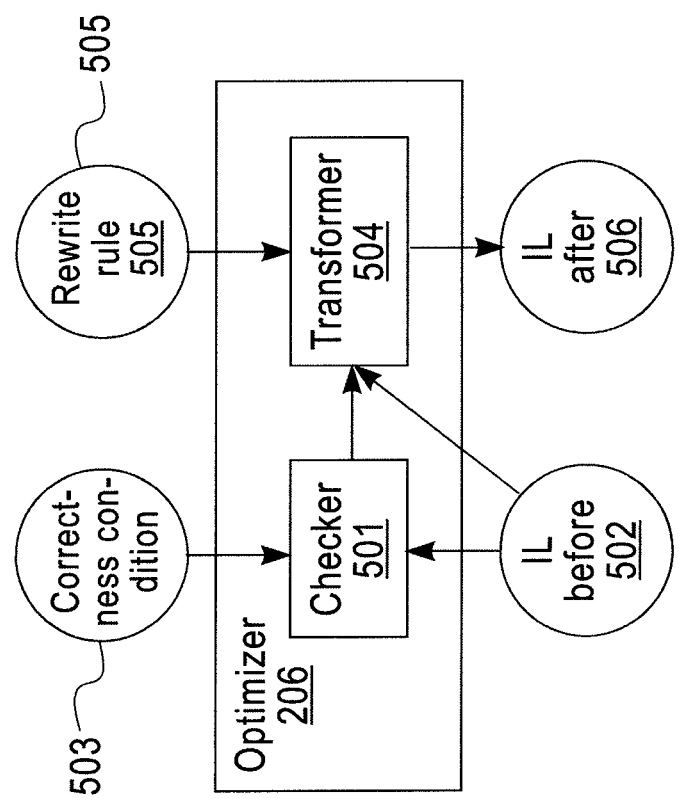
FIG. 5 is a detailed view of an optimizer component from FIG. 2.

The VEE as described so far fulfills its role for mapping from streaming languages to platforms. No optimizer is required for this role, but the VEE is well-suited for supporting optimizers as IL-to-IL transformers. Therefore, the VEE optionally contains one or more optimizers 206. As illustrated in FIG. 5, in general, an optimizer for our VEE may:

1. Use a checker 501 to determine whether the IL before optimization 502 satisfies the correctness conditions 503 required for the optimization to be applicable.

2. Use a transformer 504 to apply the rewrite rule 505. If the checker determined that the optimization is applicable, then the transformer rewrites the IL before optimization into the IL after optimization 506.

The method above may iterate multiple times. The translator creates the first version of the IL. Optimizers repeatedly transform the IL, each time using the previous optimization's output as the next optimization's input. A last version of the IL gets executed on the platform.

Figure 7A:
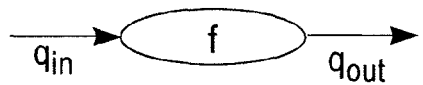
FIG. 7 illustrates three optimizations by showing the IL before and after rewriting according to an embodiment of the present disclosure.
Figure 7B:
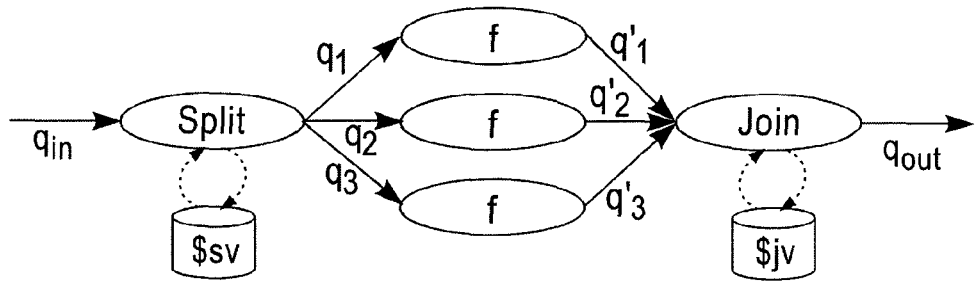

These general steps have been illustrated by specific optimizers for three exemplary optimizations splitting, fusion, and reordering. Considering the following an example:

FIGS. 7(A) and (B) show an IL snippet before and after applying the splitting optimization. Splitting introduces additional data parallelism. The optimizer checks the correctness condition that the operator is stateless. Since the IL makes all state explicit as variables, the correctness condition may be checked by asserting that the operator is not connected to any variables. The optimizer applies the rewrite rule that inserts a splitter, multiple replicas of the operator, and a joiner. Since the IL follows single-use and single-definition rules for queues, the original input and output queues of the operator are unique and can be rewritten to follow the new topology.

Figure 7C:
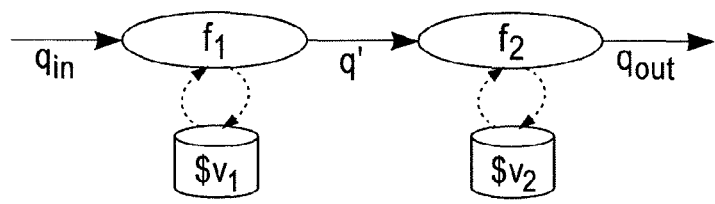
Figure 7D:
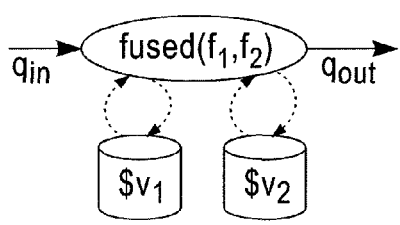

FIGS. 7(C) and (D) show an IL snippet before and after applying the fusion optimization. Fusion reduces communication overhead. The correctness condition is that if the operators are connected to any variables, those variables are private and not used by any other operators. The rewrite rule replaces the two operators by a single operator, and introduces a new function fused($f_1,f_2$) that executes first $f_1$ and then $f_2$.

Figure 7E:
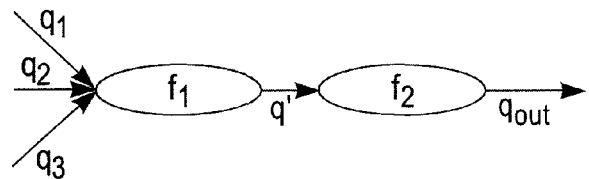
Figure 7F:
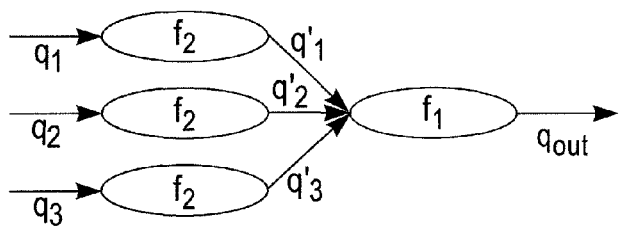

FIGS. 7(E) and (F) show an IL snippet before and after applying the reordering optimization. Reordering $f_1 \rightarrow f_2$ as $f_2 \rightarrow f_1$ is effective if $f_1$ is expensive and $f_2$ reduces the data volume. The correctness condition is that (i) both operators are stateless; (ii) $f_1$ forwards a part r of the data unmodified; and (iii) $f_2$ is a filter that only reads r and forwards each data item completely unmodified. The rewrite rule places replicas of $f_2$ on each input queue of $f_1$.

These three examples (splitting, fusion, and reordering) are representative for other streaming optimizations. By following the optimizer method outlined here, other optimizations can be applied to the streaming IL.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more non-transitory computer readable medium(s) having computer readable program code embodied thereon.

It is to be understood that embodiments of the present disclosure may be implemented in various forms of hardware, software, firmware, special purpose processors, or a combination thereof. In one embodiment, a VEE for streaming languages may be implemented in software as an application program tangibly embodied on a non-transitory computer readable medium. As such the application program is embodied on a non-transitory tangible media. The application program may be uploaded to, and executed by, a processor comprising any suitable architecture.

Figure 8:
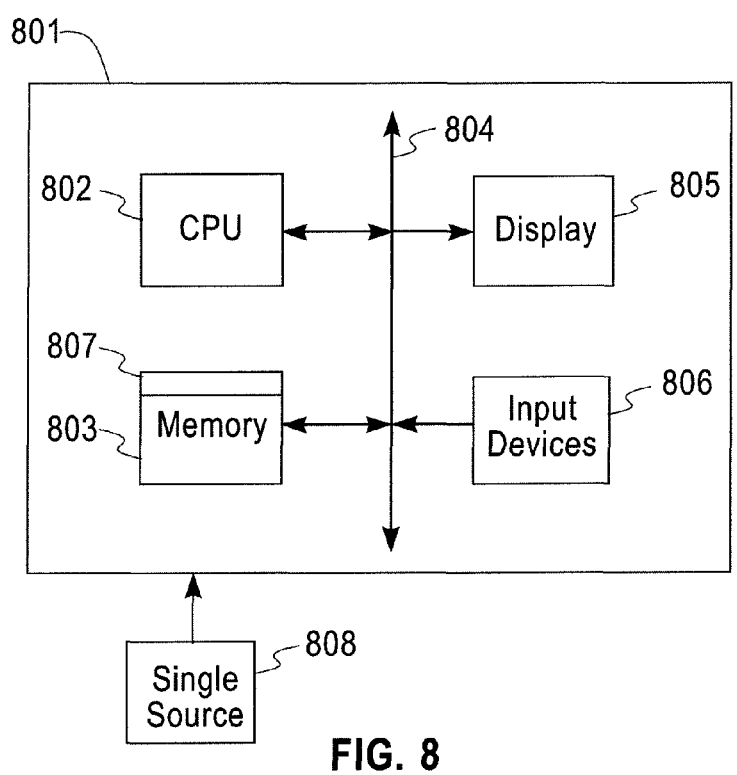
FIG. 8 is an exemplary computer system for executing computer code for implementing a VEE with an IL according to an embodiment of the present disclosure.

Referring to FIG. 8, according to an embodiment of the present disclosure, a computer system 801 for implementing a VEE for streaming languages can comprise, inter alia, a central processing unit (CPU) 802, a memory 803 and an input/output (I/O) interface 804. The computer system 801 is generally coupled through the I/O interface 804 to a display 805 and various input devices 806 such as a mouse and keyboard. The support circuits can include circuits such as cache, power supplies, clock circuits, and a communications bus. The memory 803 can include random access memory (RAM), read only memory (ROM), disk drive, tape drive, etc., or a combination thereof. The present invention can be implemented as a routine 807 that is stored in memory 803 and executed by the CPU 802 to process the signal from the signal source 808. As such, the computer system 801 is a general-purpose computer system that becomes a specific purpose computer system when executing the routine 807 of the present invention.

The computer platform 801 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a VEE for streaming languages, it is noted that modifications and variations can be made by persons skilled in the art in light of the above teachings. It is therefore to be understood that changes may be made in exemplary embodiments of disclosure, which are within the scope and spirit of the invention as defined by the appended claims. Having thus described the invention with the details and particularity required by the patent laws, what is claimed and desired protected by Letters Patent is set forth in the appended claims.

What is claimed is:

1. A Virtual Execution Environment (VEE) embodied in a non-transitory computer readable medium executed by a processor for performing a method implementing a streaming Intermediate Language (IL), wherein the streaming IL represents a streaming program and the method includes:
   communicating streaming data in queues;
   storing data-at-rest in variables; and
   determining data by functions, where inputs are read from the queues and the variables, and outputs are written to the queues and the variables,
   wherein the VEE includes the streaming IL, a plurality of translators, and a plurality of corresponding runtimes, wherein each of the plurality of translators maps a corresponding streaming language into the streaming IL, and the corresponding runtime executes the streaming IL on a platform.

2. The VEE as in claim 1, wherein each of the plurality of translators maps a program from its corresponding streaming language to the streaming IL, the mapping comprising:
   mapping communication to the queues in the streaming IL;
   mapping state to the variables in the streaming IL; and
   mapping computation to the functions in the streaming IL.

3. The VEE as in claim 2, wherein the corresponding runtime executes the streaming IL on a platform, the execution comprising:
   making the streaming IL executable on the platform by using a compiler or interpreter; and
   running the streaming IL on the platform by using a host controller.

4. The VEE as in claim 3, wherein the platform is distributed, and the corresponding runtime further comprises:
   using multiple host controllers, one for each host in the distributed platform, to manage the portion of the streaming program on each host.

5. The VEE as in claim 4, wherein the VEE comprises an optimizer, wherein the optimizer transforms the streaming IL by determining whether the streaming IL satisfies preconditions of an optimization, and applying a rewrite rule of the optimization to the streaming IL.

6. A Virtual Execution Environment (VEE) embodied in a non-transitory computer readable medium executed by a processor, the VEE comprising one translator module for each of a plurality of streaming languages to a streaming Intermediate Language (IL), and one runtime module for each of a plurality of platforms to execute the streaming IL, wherein the streaming IL supports each of the plurality of languages by translation, and the VEE maps to each of the plurality of platforms.

7. The VEE of claim 6, further comprising an optimizer module transforming the streaming IL by determining whether the streaming IL satisfies preconditions of an optimization, and applying a rewrite rule of the optimization to the streaming IL.

8. A Virtual Execution Environment (VEE) embodied in a non-transitory computer readable medium executed by a plurality of processors communicating via a network for managing a streaming language execution environment, the method including:
   providing a streaming Intermediate Language (IL) representing a streaming program;
   communicating streaming data in queues between the plurality of processors;
   storing data-at-rest in variables shared by the plurality of processors; and
   determining data by functions, where inputs are read from the queues and the variables, and outputs are written to the queues and the variables,
   wherein the VEE includes the streaming IL, a plurality of translators, and a plurality of corresponding runtimes, wherein each of the plurality of translators maps a corresponding streaming language into the streaming IL, and the corresponding runtime executes the streaming IL on a platform.

9. The VEE as in claim 8, wherein each of the plurality of translators maps a program from its corresponding streaming language to the streaming IL, the mapping comprising: mapping communication to the queues in the streaming IL; mapping state to the variables in the streaming IL; and mapping computation to the functions in the streaming IL.

10. The VEE as in claim 9, wherein the corresponding runtime executes the streaming IL on a platform, the execution comprising:
    making the streaming IL executable on the platform by using a compiler or interpreter; and
    running the streaming IL on the platform by using a host controller.

11. The VEE as in claim 10, wherein the platform is distributed, and corresponding the runtime further comprises: using multiple host controllers, one for each host in the distributed platform, to manage the portion of the streaming program on each host.

12. The VEE as in claim 11, wherein the VEE comprises an optimizer, wherein the optimizer transforms the streaming IL by determining whether the streaming IL satisfies preconditions of an optimization, and applying a rewrite rule of the optimization to the streaming IL.

* * * * *

UNITED STATES PATENT AND TRADEMARK OFFICE
CERTIFICATE OF CORRECTION

PATENT NO. : 8,499,292 B2  
APPLICATION NO. : 12/719364  
DATED : July 30, 2013  
INVENTOR(S) : Henrique Andrade et al.

Page 1 of 1

It is certified that error appears in the above-identified patent and that said Letters Patent is hereby corrected as shown below:

ON THE TITLE PAGE, ITEM (73), THE ASSIGNEE INFORMATION SHOULD READ:

ASSIGNEE: INTERNATIONAL BUSINESS MACHINES CORPORATION, ARMONK NY (US)
NEW YORK UNIVERSITY, NEW YORK, NY (US)

Signed and Sealed this
Twenty-fifth Day of February, 2014

Michelle K. Lee
*Deputy Director of the United States Patent and Trademark Office*